May 24, 1960     G. BETHMANN     2,937,587
DEPTH OF FIELD MECHANISM FOR PHOTOGRAPHIC CAMERAS
Filed Feb. 29, 1956     2 Sheets-Sheet 1

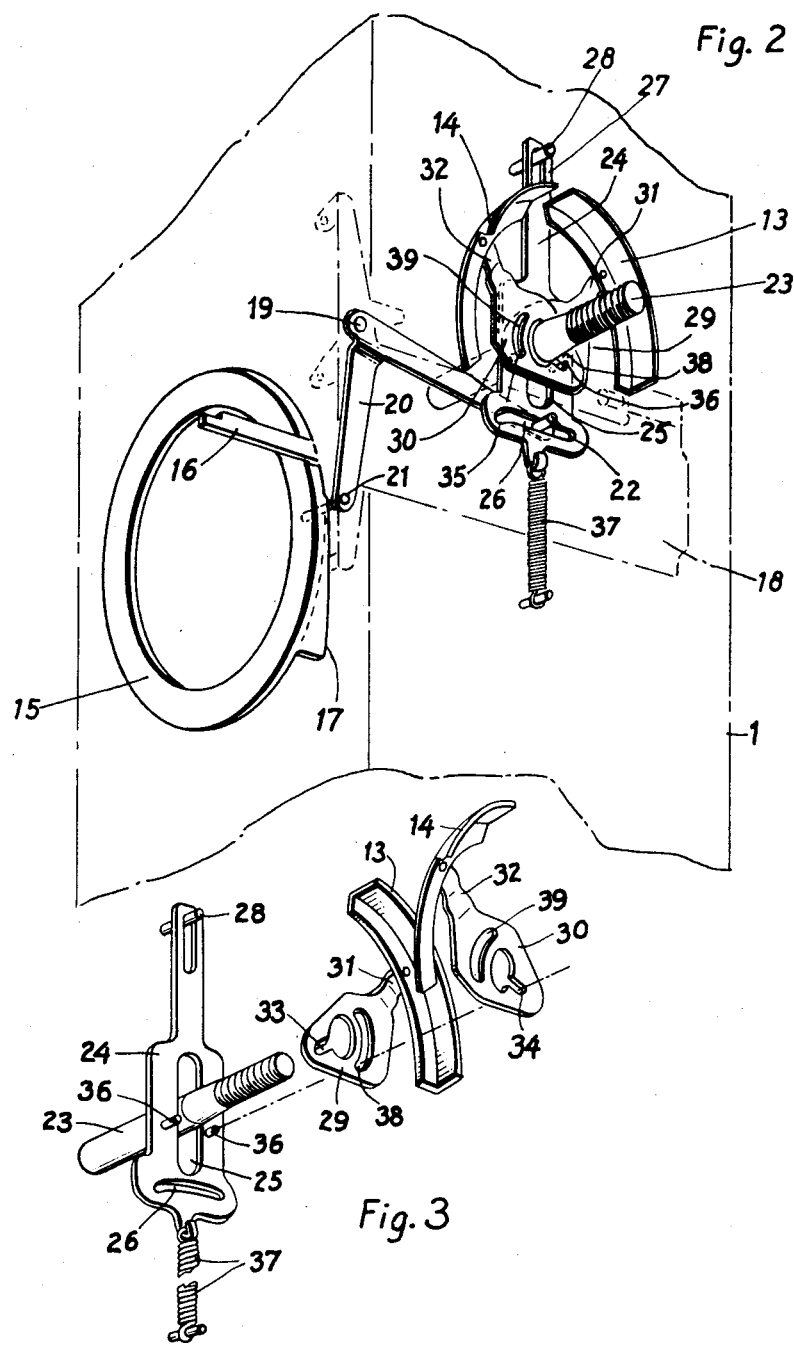

United States Patent Office 2,937,587
Patented May 24, 1960

2,937,587

DEPTH OF FIELD MECHANISM FOR PHOTOGRAPHIC CAMERAS

Gustav Bethmann, Braunschweig, Germany, assignor to Franke & Heidecke, Fabrik Photographischer Prazisions-Apparate, Braunschweig, Germany, a German firm Filed Feb. 29, 1956, Ser. No. 568,626

Claims priority, application Germany Mar. 3, 1955

4 Claims. (Cl. 95—64)

The present invention relates to a photographic camera having mechanism for indicating the depth of field; that is, the maximum and minimum distances from the camera of objects in the field of view which will be within acceptably sharp focus.

An object of the invention is the provision of generally improved and more satisfactory mechanism for indicating the depth of field.

Another object is the provision of depth of field mechanism particularly adapted for use in a camera in which the focusing scale is at some distance from the diaphragm adjusting mechanism.

Still another object is the provision of simplified depth of field mechanism so constructed and arranged as to be suitable for use with a camera of the twin lens reflex type.

A further object is the provision of a depth of field indicator controlled by the focusing movements and diaphragm adjusting movements of the camera parts, and cooperating with a focusing knob and focusing scale mounted on the side wall of the camera body, at a point remote from the diaphragm.

A still further object is the provision of depth of field indicating mechanism which is particularly simple, inexpensive, and rugged in construction.

These and other desirable objects may be attained in the manner disclosed as an illustrative embodiment of the invention in the following description and in the accompanying drawings forming a part hereof, in which:

Fig. 2 is a diagrammatic skeletonized perspective view of the camera with parts omitted, showing details of the construction according to a preferred embodiment of the present invention; and Fig. 3 is an exploded perspective view of some of the parts shown in Fig. 2.

The same reference numerals throughout the several views indicate the same parts.

Figure 1:
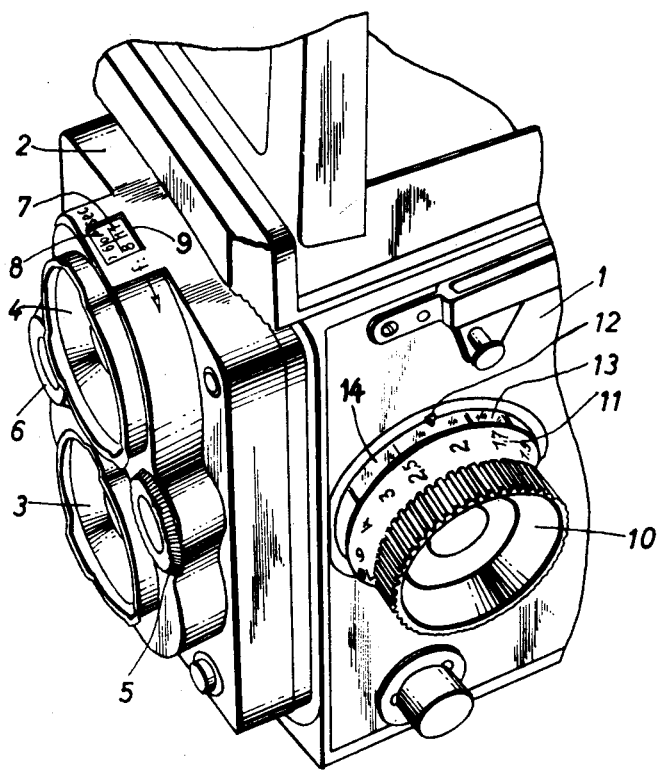
Fig. 1 is a perspective view of a portion of a photographic camera equipped with the present invention.

The structure of the present invention may be used on photographic cameras of various different kinds and styles, but is particularly adapted to a twin lens reflex camera, in which the picture taking lens and the finder lens are mounted on a lens board or camera front member which moves forwardly and backwardly along the optical axis, relative to the main camera body, for focusing purposes, the focusing movements being controlled by a manipulating knob located usually on the left hand side wall of the camera body, and the focusing scale or distance scale being associated with this knob. A familiar example of such a camera is the well known "Rolleiflex" camera manufactured by the firm of Franke & Heidecke in Braunschweig, Germany, and widely sold throughout the United States and elsewhere. The present invention is illustrated in connection with a camera of this kind, but it may be used on other makes or brands of cameras, as already indicated above.

The main camera body is indicated in general at 1, and the lens board or movable front member is shown at 2. This member 2 is movable forwardly and rearwardly for focusing, and it carries the lower or picture taking lens 3, and the upper or finder lens 4. As well understood by those familiar with the above mentioned "Rolleiflex" cameras, a shutter with an adjustable iris diaphragm is associated with the picture taking lens 3, and the construction includes small knobs or setting wheels 5 and 6 which, when turned, serve to adjust the shutter speed and the diaphragm aperture or stop. The values to which these variables have been set at any given instant can be read by means of the diaphragm aperture scale 7 and the shutter speed scale 8 which appear through a window 9 at the top of the lens board or front structure 2, all in a familiar manner well known to the users of the particular camera mentioned.

The forward and backward focusing movement of the member 2, in the direction of the optical axes of the lenses 3 and 4, is accomplished by means of a focusing knob 10 mounted on the left hand side wall of the camera body 1. On a portion of this knob 10, or on a separate scale member fixed to it, there is the focusing distance scale 11, graduated in any suitable units of linear measurement such as meters or feet, which scale is read in conjunction with a fixed reference mark or pointer 12 on the side wall of the camera.

Fixed to the front structure 2 are rearwardly extending side arms 18 at opposite sides of the camera body, which arms 18 are slidable longitudinally (parallel to the optical axis) along guideways in the camera body. As is usual in cameras of this type having an objective shutter and an adjustable iris diaphragm mounted in the shutter structure, the size of the diaphragm aperture or stop is adjusted by turning a diaphragm adjusting ring rotatable about the optical axis of the picture taking lens 3 as a center.

The ring 15 indicated in Fig. 2 represents either this diaphragm adjusting ring or, if desired, a separate ring mounted in the rear of the regular diaphragm adjusting ring and rotatable about the same optical axis of the lens 3 and coupled to the regular diaphragm adjusting ring by means of an arm 16 rigidly secured to the ring 15 and extending forwardly into a notch or recess in the regular diaphragm adjusting ring so that the two rings move together as one. Hence the ring 15 shown in Fig. 2 may be called a diaphragm adjusting ring since in any event it turns with the adjustment of the diaphragm, regardless of whether it does or does not constitute the ring directly connected to the diaphragm leaves or blades.

On the ring 15 is a cam portion 17 which engages a pin 21 on a downwardly extending arm of a bellcrank lever 20 which is pivoted or fulcrumed at 19 on the guide rail 18 which, as above mentioned, constitutes part of and moves with the lens board or front member 2. The rearwardly extending arm of this bellcrank lever 20 carries a laterally extending pin 22 which engages in a slot 26 in a vertical slide 24 arranged on the side wall structure of the camera, preferably inside and hidden from view by the outer casing or housing wall. This vertical slide 24 has a vertical guide slot 25 which is guided on the shaft 23 of the focusing knob 10, and at its upper end another vertical guide slot 27 guided by a fixed pin 28 on the side wall structure of the camera. A light spring 37 constantly tends to pull downwardly on the vertical slide 24, tending to keep it in its lowest position and thus, through the engagement of the pin 22 in the slot 26, tending also to keep the pin 21 engaged with the effective working face of the cam 17 on the diaphragm adjusting ring 15.

Rotatable on the focusing knob shaft 23 are two arms 29 and 30 having respective extensions 31 and 32 which respectively carry index members 13 and 14 arranged coaxially with the shaft 23 and in cooperative relation to the focusing scale 11 on the knob 10. These index members 13 and 14 may be in the form of simple pointers serving to mark off a range of maximum and minimum distances on the focusing distance scale 11, but preferably they are in the form of arcuate shields or shutter members which overlie the scale 11 and hide or obscure it except where it is uncovered between the two shield members 13 and 14.

These arms 31 and 32 which carry the indicating members or index members 13 and 14 have cam slots 33 and 34, respectively, which are respectively engaged by pins 35 and 36 on the vertical slide 24, which pins extend idly through wide arcuate clearance slots 38 and 39 concentrically formed in the respective arms 29, 31 and 30, 32. With this arrangement it is seen that as the ring 15 is turned to change the size of the diaphragm aperture or stop, the cam 17, acting on the pin 21, will swing the bellcrank lever 20 in one direction or the other. Through the pin 22, this swinging of the bellcrank lever will cause a vertical movement of the vertical slide 24, and the pins 35 and 36 on the latter will cause the arms 31 and 32 to swing, thereby varying the position of the index members or indicating members 13 and 14 with respect to the focusing scale 11 connected to the focusing knob 10. The parts are, of course, so arranged that when the ring 15 is turned to a smaller diaphragm aperture or stop, the arms 31 and 32 are turned to swing the indicating members 13 and 14 further away from each other, to indicate on the focusing distance scale 11 an increased depth of field. Likewise, when the ring 15 is turned to increase the size of the diaphragm aperture or stop, the arms 31 and 32 are swung toward each other so that the indicating or indexing members 13 and 14 indicate, on the distance scale, a decreased depth of field.

That part of the length of the slot 26 which is engaged by the pin 22 when the camera is focused for objects at great distance and medium distance, is arranged parallel to the optical axis and parallel to the direction of movement when focusing, so that when focusing through the range of medium distances and great distances, the focusing movements themselves will cause no vertical movement of the slide 24 and no change in the position of the indexing members 13 and 14. However, when the camera is focused for every close or short distances, the proper spacing of the indicating members 13 and 14 from each other depends not alone on the size of the diaphragm aperture but also upon the distance for which the camera is focused, so that it is necessary to introduce another variation or factor, depending on the focus distance. This is accomplished in the present instance by shaping the slot 26 accordingly. That is, the portion of the slot 26 which will be engaged by the cam 22 when the camera is focused for vary close distances, can be of curved or cam shape to such extent as may be required to introduce the necessary correction for close distance. Thus the slot 26 may be described in general as extending parallel to the optical axis, or parallel to the direction of motion of the lens board member 2, but at such points as may be necessary the shape of this slot 26 is varied or altered from a straight line, so as to give the desired accurate results on the focusing scale 11. Usually the forward part of the slot 26 (that is, the part engaged by the pin 22 when the lenses are moved forwardly for focusing on a near object) is curved slightly downwardly from a straight line, as seen in Fig. 3.

It is well known that in many modern cameras, the diaphragm aperture scale 7 is usually graduated linearly, that is, equal distances along the scale indicating equal proportional variations in aperture, and the focusing distance scale 11 is usually graduated non-linearly, such as in a hyperbolic manner. In any event, whether the scales are respectively graduated linearly and hyperbolically or whether other forms of graduation are employed, the scales usually do not have a linear or proportional relationship to each other. The present construction is a particularly simple and suitable one for these non-linear relationships, since it is an easy matter to shape the effective edge of the cam 17 in whatever shape is required for moving the vertical slide 24 in proper relation to the changes in adjustment of the diaphragm aperture, and an easy matter to shape the slot 26 in any manner required for giving a proper increment of vertical motion to the slide 24 in accordance with the distance for which the camera is focused at any particular time, especially when focusing it for relatively near or close distances. Yet along with this ability to introduce all necessary corrections or variations and to produce an indicating mechanism of great accuracy, the construction itself is of extreme simplicity, easy and inexpensive to make and to maintain in working order.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body, a lens carrier for carrying a lens having an optical axis, said carrier being movable forwardly and rearwardly relative to said body in the direction of said optical axis for focusing said body having a side wall extending substantially parallel to said optical axis and offset laterally therefrom, a focusing knob rotatably mounted on said side wall of said body in position to be manually grasped and turned for moving said lens carried forwardly and rearwardly, a focusing scale mounted coaxially with and connected to said knob to be moved thereby, a depth of field indicating member movable with respect to said focusing scale and covering and obscuring a portion of said scale for indicating on said scale a distance limit of objects in acceptably sharp focus by obscuring a portion of said scale corresponding to distances of objects not in acceptably sharp focus, a ring mounted on said lens carrier for rotary movement in accordance with changes in diaphragm aperture, said ring being movable axially relative to said body with axial movements of said lens carrier, a cam on said ring, said cam having a rise in the direction of said optical axis, a lever mounted on said lens carrier to move bodily therewith and engaging said cam to be moved thereby when the diaphragm aperture is changed, a slide mounted on said body for movement thereon in a direction at an angle to the direction of focusing movement of said lens carrier, an operative connection between said lever and said slide to move said slide from the movements of said lever caused by said cam, and an operative connection between said slide and said indicating member for moving said indicating member relative to said focusing scale from the movement of said slide.

2. A photographic camera comprising a body, a lens carrier for carrying a lens having an optical axis, said carrier being movable forwardly and rearwardly relative to said body in the direction of said optical axis for focusing, said body having a side wall extending substantially parallel to said optical axis and offset laterally therefrom, a focusing knob rotatably mounted on said side wall of said body in position to be manually grasped and turned for moving said lens carrier forwardly and rearwardly, a focusing scale mounted coaxially with and connected to said knob to be moved thereby, a depth of field indicating member movable with respect to said scale for indicating with reference to said scale a distance limit of objects in acceptably sharp focus, a ring mounted on said lens carrier for rotary movement in accordance with changes in diaphragm aperture, said ring being movable axially relative to said body with axial movements of said lens carrier, a cam on said ring, said cam having a rise in the direction of said optical axis, a lever mounted on said lens carrier to move bodily therewith and engaging said cam to be moved thereby when the diaphragm aperture is changed, a slide mounted on said body for movement thereon in a direction at an angle to the direction of focusing movement of said lens carrier, an operative connection between said lever and said slide to move said slide from the movements of said lever caused by said cam, and an operative connection between said slide and said indicating member for moving said indicating member relative to said focusing scale from the movements of said slide, said operative connection between said lever and said slide including a pin and slot connection, the slot thereof extending in a general direction parallel to the direction of focusing movement of said lens carrier, the portion of said slot engaged by said pin when the camera is focused for relatively close objects being of cam formation in non-parallel relation to said focusing movement, so that focusing movement of said lens carrier for relatively close objects will cause a movement of said slide and said indicating member in addition to any movement thereof caused by turning said ring in accordance with changes in diaphragm aperture.

3. A photographic camera comprising a body, a lens carrier for carrying a lens having an optical axis, said carrier being movable forwardly and rearwardly relative to said body in the direction of said optical axis for focusing, said body having a side wall extending substantially parallel to said optical axis and offset laterally therefrom, a focusing knob rotatably mounted on said side wall of said body in position to be manually grasped and turned for moving said lens carrier forwardly and rearwardly, a focusing scale mounted coaxially with and connected to said knob to be moved thereby, a depth of field indicating member movable with respect to said scale for indicating with reference to said scale a distance limit of objects in acceptably sharp focus, a ring mounted on said lens carrier for rotary movement in accordance with changes in diaphragm aperture, said ring being movable axially relative to said body with axial movements of said lens carrier, a cam on said ring, said cam having a rise in the direction of said optical axis, a lever mounted on said lens carrier to move bodily therewith and engaging said cam to be moved thereby when the diaphragm aperture is changed, a slide mounted on said body for movement thereon in a direction at an angle to the direction of focusing movement of said lens carrier, an operative connection between said lever and said slide to move said slide from the movements of said lever caused by said cam, an operative connection between said slide and said indicating member for moving said indicating member relative to said focusing scale from the movements of said slide, and a second depth of field indicating member operatively connected to said slide to be moved thereby concurrently with the movement of said first mentioned indicating member, said first and second indicating members both being in the form of shields covering and obscuring the otherwise visible portions of said focusing scale which represent distances outside of said range of acceptably sharp focus and leaving visible between said two members only the portions of said scale representing the distances of objects which will be within acceptably sharp focus under existing setting conditions of the camera.

4. A photographic camera comprising a body, a lens support, a lens carried by said lens support, said lens support being mounted on said body for focusing movement relative thereto in the direction of the optical axis of said lens, a diaphragm aperture adjusting ring mounted on said support for rotary movement about said optical axis and for bodily forward and backward movement with said lens support during focusing movements thereof, a cam connected to said ring to move therewith, a pivot on said lens support to move bodily therewith when said support undergoes a focusing movement relative to said body, a focus adjusting knob mounted on a side wall of said body for rotation about an axis extending approximately at right angles to said optical axis, said axis of said knob being rearwardly from said pivot in all adjusted positions of said lens support, a focus distance scale connected to said knob to turn therewith, a bell crank lever pivotally mounted on said pivot and having one arm engaging said cam to be moved thereby when said ring is turned and having a second arm etxending rearwardly from said pivot in a general direction toward said knob, and depth of field indicating means movable relative to said distance scale and operated by said second arm of said bell crank lever for indicating on said scale a range of distances within which articles in the field of view of the camera will be in acceptably sharp focus, said depth of field indicating means including a pair of arcuate masking members rotatable simultaneously in opposite directions about the axis of said focus adjusting knob as a center of rotation, the unmasked space between said arcuate masking members serving, in conjunction with said focus distance scale adjacent thereto, to indicate the near and far limits of said range of distances.

References Cited in the file of this patent

UNITED STATES PATENTS

| | | |
|---|---|---|
| 2,342,819 | Preiseman | Feb. 29, 1944 |
| 2,350,009 | Babcock et al. | May 30, 1944 |
| 2,397,915 | Bolsey | Apr. 9, 1945 |

FOREIGN PATENTS

| | | |
|---|---|---|
| 655,518 | Germany | Jan. 20, 1938 |
| 139,562 | Austria | Nov. 26, 1934 |
| 1,083,260 | France | Jan. 6, 1955 |